3,590,099
CONVERSION OF MIXED BUTENES
TO ISOAMYLENES
Robert L. Banks, Bartlesville, Okla., assignor to
Phillips Petroleum Company
Filed Apr. 18, 1968, Ser. No. 722,398
Int. Cl. C07c 3/62
U.S. Cl. 260—683D      4 Claims

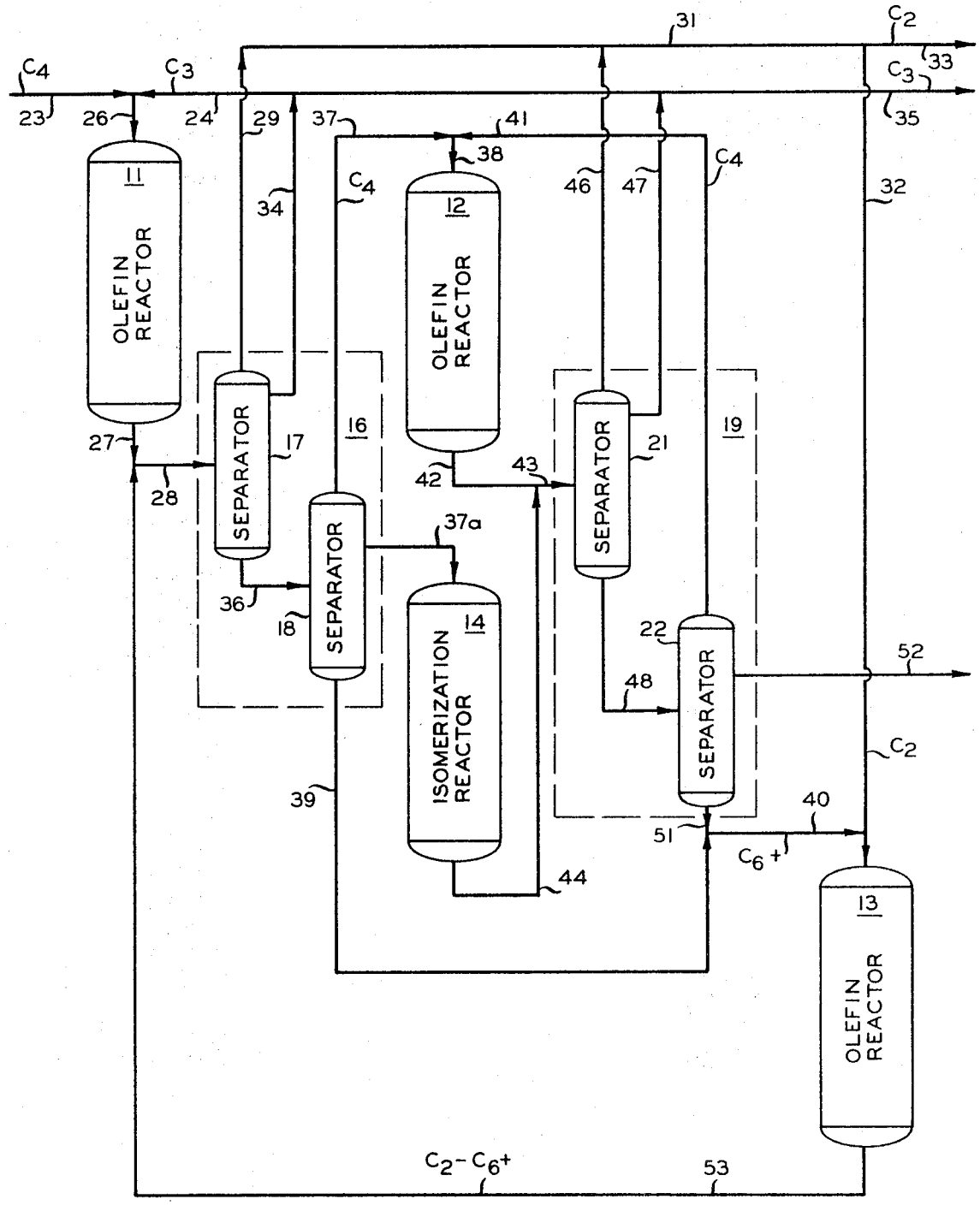

ABSTRACT OF THE DISCLOSURE

A mixed butenes feed stream containing n-butene as well as isobutene is efficiently converted to isoamylenes by reacting the butenes together with propylene to produce mixed amylenes, skeletally isomerizing the mixed amylenes, converting mixed butenes from the first conversion in a second conversion to produce additional mixed amylenes, reacting produced ethylene and $C_6$ and heavier hydrocarbons to produce additional quantities of $C_3$ to $C_5$ hydrocarbons, and producing a mixed amylene stream.

---

This invention relates to producing isoamylenes from mixed butenes. In one aspect it relates to prodcing isoamylenes from mixed butenes containing a relatively small percentage of isobutene.

In many instances, it is desirable to convert a linear acyclic olefin hydrocarbon to produce a branched acyclic olefin hydrocarbon. For instance, isoamylene which is a valuable intermediate for the production of isoprene, is a desirable product to produce from a relatively inexpensive and readily available feed stock, such as mixed butenes.

An object of the invention is to convert mixed butenes to isoamylenes. Another object of the invention is to produce isoamylenes from a mixed butene stream relatively rich in n-butenes. Other aspects, objects and the advantages of the invention are apparent in the written disclosure, the drawing, and the claims.

According to the invention, three olefin reaction steps, a skeletal isomerization step and two separation steps, are combined to convert normal butenes into isoamylenes.

Further according to the invention, a stream comprising n-butene and isobutene is reacted with propylene in an olefin reaction zone to produce mixed amylenes. The mixed amylenes are skeletally isomerized, thus increasing the ratio of isoamylene to n-amylenes and the unreacted butenes having a lower percentage of n-butene are reacted in the second olefin reaction zone to produce additional quantities of amylenes relatively rich in isoamylenes, and produced olefins heavier than amylenes are reacted in a third olefin reaction in the presence of ethylene to produce additional quantities of lower olefins which can be utilized to produce additional amounts of isoamylenes.

The process of the invention is particularly well suited for producing isoamylenes from a mixed butene feed stream which contains less than the ordinarily desired molar ratio of isobutene to n-butene (about 1:1). The invention is useful, for example, in feedstocks wherein the butene content is about 60–70 percent n-butenes and only about 30–40 percent isobutenes. The feedstocks, together with recycle propylene, is contacted with an olefin disproportionation catalyst under conditions which yield isoamylenes and also, because of the high n-butene content, a substantial amount of n-amylenes. The presence of a double bond isomerization catalyst, such as magnesium oxide, as a mixed bed with the olefin disproportionation catalyst, promotes the conversion. The effluent from this olefin reaction unit is separated and propylene recycled to the first olefin reaction unit. Mixed butenes, separated from said effluent, now containing a relatively higher ratio of isobutene to n-butene are then conducted to a second olefin reaction unit for conversion to isamylenes. The desired isobutene content for the mixed butene feed stream to the second olefin reaction zone is at least about 50 percent isobutene. If desired, some double bond isomerization can be provided in this zone also or the mixed butenes can be passed through a separate isomerization unit prior to contact with the olefin reaction catalyst.

Mixed amylenes from the effluent of the first olefin reaction zone are conducted to a skeletal isomerization unit containing a catalyst which is active for providing an equilibrium mixture of branched and linear amylenes. The effluent from this isomerization zone is conducted to separation stages.

Heavier olefin by-products, such as isohexenes, produced from any of the above zones are conducted to a third olefin reaction unit. Ethylene also generated in one or more of the above units is blended with the heavier olefinic by-product stream for conversion in the third olefin reaction zone. If desired, part or all of the ethylene can be replaced with propylene. The effluent from the third olefin reaction zone contains isoamylenes, isobutene, n-butenes, and propylene as well as some unconverted reactants.

The operating conditions for each of the catalyst steps depend upon the specific catalyst utilized.

By-product materials other than ethylene and propylene are relatively insignificant. However, a small amount of paraffin materials can be formed and these can be removed at any convenient point in the process, together with any paraffinic materials included in the feedstock. It is also sometimes advantageous to feed to the olefin reaction zones feed streams which have been deoiled, that is, which have had any materials heavier than the feed removed, for example, by distillation. In this way, the accumulation or carry-over of small amounts of materials which may poison or shorten the life of the catalyst is avoided.

The term "olefin reaction" as used herein is defined as a process for the catalytic conversion over a catalyst of a feed comprising one or more ethylenically unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated compounds, and compounds which can be visualized as formed by skeletal isomerization but which cannot be visualized as formed by one or more of the above-noted reactions, comprises less than 25 percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or in different molecules.

The olefin reaction, as used in the present invention, is illustrated by the following reactions:

(1) The disproportionation of an acyclic mono- or polyene having at least 3 carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having 3 or more carbon atoms and a different acyclic mono- or polyene having 3 or more carbon atoms to produce different acyclic olefins; for example, the conversion of butene-2 and isobutylene yields propylene and isopentene; and (3) The conversion of ethylene and an internal acyclic mono- or polyene having 4 or more carbon atoms to produce other olefins having a lower number of carbon atoms than that of the acyclic mono- or polyenes; for example, the conversion of ethylene and 4-methylpentene-2 yields propylene and 2-methylbutene-1.

The catalysts which are applicable in the present invention include all of those which have activity for the disproportionation of propylene to ethylene and butene. Some examples of such catalysts are:

(1) Silica or thoria promoted by an oxide or a compound convertible to the oxide by calcination of tungsten, molybdenum, rhenium or tellurium or by a sulfide of tungsten or molybdenum;

(2) Alumina promoted by an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;

(3) One or more of the group aluminum phosphate, zirconium phosphate, calcium phosphate, magnesium phosphate, or titanium phosphate promoted by one or more of a sulfide of molybdenum or tungsten, or an oxide or a compound convertible to an oxide by calcination of molybdenum, tungsten or rhenium or magnesium tungstate or beryllium phosphotungstate;

(4) Silica, alumina, aluminum phosphate, zirconium phosphate, calcium phosphate, magnesium phosphate, or titanium phosphate promoted by a hexacarbonyl of molybdenum or tungsten; and (5) Homogeneous olefin reaction catalysts can be used where appropriate. In such embodiments, catalyst removal and/or recovery steps normally are required. For example, transition metal-containing homogeneous catalyst systems, active for the disproportionation of olefins, can be used. An example of one such catalyst system is bis(triphenylphosphine)dinitrosyldichloromolybdenum and methylaluminum sesquichloride which can be used at atmospheric pressure, room temperature, and preferably in the presence of a reaction diluent. Some suitable homogeneous catalyst systems are disclosed and claimed in U.S. Ser. Nos. 635,649 (now abandoned), 635,657 (now abandoned), 635,669 (now abandoned), 635,693 (now abandoned, 635,708, filed May 3, 1967; and 694,872 (now abandoned), 694,873 (now abandoned), 694,874, filed Jan. 2, 1968; and 696,109 (now abandoned), filed Jan. 8, 1968.

The catalysts of (1) can be prepared and activated by conventional techniques such as by combining a catalyst grade silica with a suitable tungsten, molybdenum, rhenium or tellurium compound by a conventional method such as, for example, impregnation, dry mixing or coprecipitation. Suitable tungsten and molybdenum compounds include tungsten oxide and molybdenum oxide and compounds convertible to the oxide, tungsten sulfide and molybdenum sulfide. The supported oxides and compounds convertible to the oxide are activated by calcining in air, and the supported sulfides are activated by heating in an inert atmosphere.

The catalysts of (2) can be prepared and activated by conventional techniques such as by combining catalyst grade alumina with an oxide or compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate, followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball milled with a support such as zirconium phosphate, followed by heating in an inert atmosphere such as nitrogen. Magnesium tungstate and beryllium phosphotungstate can be dry mixed with titanium phosphate, for example, and activated by calcination in air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalyst compositions of (5) can be prepared by simple combination of the transition metal compound with a suitable adjuvant such as, for example, an organoaluminum halide, under conditions suitable to provide a catalyst active for the olefin reaction.

The catalytic agent is considered to be the reaction product resulting from the admixture of the support material and the promoter material and any subsequent activation treatment.

The operating temperature for the olefin reaction is generally in the range of about 0 to 1200° F. When using the catalysts of (1), it is in the range of about 400 to about 1100° F.; when using the catalysts of (2), in the range of about 150 to 500° F.; when using the catalysts of (3), in the range of about 600 to 1200° F.; when using the catalysts of (4), in the range of about 0 to 600° F.; when using the catalysts of (5), in the range of about −20 to 170° F. In the olefin reaction process, generally the pressure is not critical except with respect to the state of the materials in the reaction zone and with respect to conditions up and downstream from the reaction zone, but generally the pressure is in the range of 0 to 2,000 p.s.i.g.

The solid catalysts of the olefin reaction can be in the form of a powder, or granules, as well as in other shapes such as agglomerates, pellets, spheres, extrudates, beads, and other forms depending upon the type of contacting technique utilized.

With a fixed bed reactor and continuous operation, weight hourly space velocity in the range of about 0.5 to 1000 parts by weight of hydrocarbon feed per part by weight of catalyst per hour (WHSV) are suitable, and excellent results have been obtained in the range of 1 to 200 WHSV.

Depending upon the specific feed materials and the specific catalysts being used, any conventional contacting technique can be utilized, such as fixed bed reaction, fluidized bed reaction, liquid phase batch reaction, and the like.

It is frequently advantageous to associate double bond isomerization with the olefin reaction. This can be done by providing a combined catalyst system which contains both an olefin reaction catalyst and a double bond isomerization catalyst. In one such system, the olefin feed sequentially contacts an isomerization catalyst and an olefin reaction catalyst. In another such system, the feed contacts a compatible mixture of such catalysts. A convenient combined catalyst system of this type is a fixed bed system containing an intimate physical mixture of a particulate olefin reaction catalyst and a particulate isomerization catalyst. When air activated refractory oxide olefin reaction catalysts are used, metal oxide isomerization catalysts such as MgO, ZnO, etc., are particularly appropriate.

At the completion of the reaction, the reaction mixture can be processed to recover any desired product by any conventional means such as fractionation, crystallization, adsorption, and the like. Unreacted material or products not in the desired molecular weight range can be recycled.

In the drawing, there is illustrated schematically apparatus suitable for practicing the present invention. The apparatus comprises a first olefin reactor 11, a second olefin reactor 12, a third olefin reactor 13 and a skeletal isomerization reactor 14. A first separation zone 16 comprises separators 17 and 18, and a second separation zone 19 comprises separators 21 and 22. Various pipes are provided connecting the individual vessels as illustrated.

In the operation of the invention, for the conversion of mixed butenes to isoamylene, a mixed stream comprising n-butene and isobutene is fed through pipe 23 and combined with propylene in pipe 24 and fed into reactor 11 through pipe 26. The effluent from reactor 11, containing reduced amounts of n-butene, isobutene, and also containing n-amylenes and isoamylenes, along with ethylene, propylene and $C_6$ and higher hydrocarbons, is removed through pipe 27 and passed through pipe 28 into first separation zone 16 in separator 17. From separator 17 ethylene is removed through pipe 29 and passed through pipe 31, from which it can be passed through pipe 32 as a portion of the feed to third olefin reactor 13, or passed through pipe 33 for other use. Propylene is removed from separator 17 through pipe 34 and passed to pipe 24 and/or pipe 35, as desired. Normal butene, isobutene, n-amylene, isoamylene and $C_6$ and heavier hydrocarbons are removed from separator 17 and passed through pipe 36 into separator 18. Butenes are removed through pipe 37 and passed through pipe 38 into olefin reactor 12. Amylenes are removed through pipe 37a and passed into isomerization reactor 14. $C_6$ and heavier hydrocarbons are removed through pipe 39 and passed through pipe 40 to olefin reactor 13.

Butenes from pipe 37 and from pipe 41 are combined and converted in olefin reactor 12. The effluent from reactor 12, comprising ethylene, propylene, butenes, amylenes and $C_6$ and heavier hydrocarbons, is removed through pipe 42 and passed through pipe 43 into separator 21 of separation zone 19. The effluent from isomerization reactor 14, enriched in isoamylenes as compared with n-amylenes, is passed through pipe 44 and pipe 43 into separator 21. Ethylene is removed from separator 21 and passed through pipe 46 to pipe 31. Propylene is removed through pipe 47 and passed to pipes 24 and/or 35 as desired. A separated stream comprising $C_4$ and heavier hydrocarbons is removed from separator 21 by pipe 48 and passed into separator 22. Butenes are passed through pipe 41 and pipe 38 to olefin reactor 12. $C_6$ and heavier hydrocarbons are removed from separator 22 through pipe 51 and passed through pipe 40 to olefin reactor 13. The amylenes product is removed from separator 22 through pipe 52. A mixed stream comprising $C_2$ to $C_6$ and heavier hydrocarbons is returned through pipe 53 to separator 17.

The amylene product from this invention is a mixture of isomers containing a high proportion of isoamylenes. Such a mixture is suitable for use for dehydrogenation to isoprene. However, if desired, the process can be used to produce an essentially pure isoamylene, 3-methyl-2-butene, by an operation (not shown) wherein only the the highest boiling amylene, 2-methyl-2-butene, is separated and removed as product. The remaining amylenes, including the linear isomers and the other branched isomers, can be recycled to the skeletal isomerization unit to produce more 2-methyl-2-butene.

The skeletal isomerization in reactor 14 can be carried out utilizing any suitable catalyst active for the skeletal isomerization of olefins. Some examples of such olefins are eta-alumina, tungsten oxide on eta-alumina, molybdena-boria-alumina, aluminum fluoride, aluminum fluoride promoted with the oxides or sulfides of tungsten, platinum or chromium, chromium sulfate, HF-treated alumina, boron phosphate on alumina, dehydrated bauxite, acid-treated clays, and the like, and mixtures thereof. In general, such catalysts are effective in continuous fixed bed or fluidized bed operation at temperatures of 600 to 1200° F. and at any convenient pressure and throughput rate.

The illustration of the invention in the drawing and the description in the specification are, of course, simplified. Many elements required in commercial operations have been eliminated, including, for example, valves, controls, etc. Any suitable separation apparatus, including larger or smaller number of separation vessels, different types of separation, etc., can be included within separation zones 16 and 19, respectively.

The invention is further illustrated by the following example:

EXAMPLE

A mixed stream comprising n-butene and isobutene is converted, according to the embodiment of the invention illustrated in the drawing. In olefin reactor 11 a bed of catalyst is maintained, the bed comprising a mixture of 1 part of a tungsten oxide supported on silica olefin reaction catalyst which is 8 weight percent tungsten oxide and 92 percent silica and 4 parts by weight of magnesium oxide. In olefin reactors 12 and 13, the catalyst is a tungsten oxide supported on silica olefin reaction catalyst having 8 weight percent tungsten oxide and 92 weight percent silica. In all three olefin reactors, reaction temperature is 750° F. In reactors 11 and 13, the pressure is 350 p.s.i.g., while in reactor 12, the pressure is 400 p.s.i.g. The weight hourly space velocities are 20, 50 and 60 in reactors 11, 12 and 13, respectively. In isomerization reactor 14, the catalyst comprises 3 percent titanium dioxide supported on 97 percent aluminum trifluoride, the temperature is 950° F., the pressure is 15 p.s.i.g. and the WHSV is 1.

The compositions of the streams in the reaction process are illustrated in the following table in mols per hour, the column headings referring to the pipes as numbered in the drawing in which the stream is found:

TABLE

| Moles/hour[1] | 23 | 24 | 27 | 29 | 32 | 34 | 36 | 33 | 35 | 37 | 37a | 39 | 41 | 42 | 44 | 46 | 47 | 48 | 51 | 53 | 52 |
|---|---|---|---|---|---|---|---|---|---|---|---|---|---|---|---|---|---|---|---|---|---|
| $C_2$= | | | 85 | 153 | 136 | | | 47 | | | | | | 30 | | 30 | | | | 68 | |
| $C_3$= | | 200 | 225 | | | 275 | | | 191 | | | | | 115 | 1 | | 116 | | | 50 | |
| i-$C_4$= | 180 | | 100 | | | | 135 | | | 135 | | | 128 | 128 | | | | 128 | | 35 | |
| n-$C_4$= | 320 | | 125 | | | | 146 | | | 146 | | | 100 | 98 | 2 | | | 100 | | 21 | |
| i-$C_5$= | | | 60 | | | | 65 | | | | 65 | | | 113 | 96 | | | 209 | | 5 | 209 |
| n-$C_5$= | | | 75 | | | | 80 | | | | 80 | | | 10 | 45 | | | 55 | | 5 | 55 |
| $C_6$+ | | | 30 | | | | 50 | | | | | 50 | | 17 | 1 | | | 18 | 18 | 20 | |
| Total | 500 | 200 | 700 | 153 | 136 | 275 | 476 | 47 | 191 | 281 | 145 | 50 | 228 | 511 | 145 | 30 | 116 | 510 | 18 | 204 | 264 |

[1] For plant producing 59,000 metric tons per year isoamylene.

That which is claimed is:

1. A process for converting a mixed first stream containing n-butene and isobutene to produce isoamylene, comprising the steps of:
    converting said first stream, together with propylene, by the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, in a first olefin reaction zone to produce n-amylene and isoamylene and to increase the ratio of isobutene to n-butene therein;

separating the effluent from said first olefin reaction zone to remove ethylene and propylene therefrom, to produce a second stream containing n-amylene and isoamylene, a third stream containing n-butene and isobutene, and a fourth stream containing $C_6$ and heavier olefins;

converting said second stream in a skeletal isomerization zone to increase the ratio of isoamylene to n-amylene therein;

converting said third stream in a second olefin reaction zone to produce additional quantities of isomylene;

separating the effluent from said second olefin reaction zone to remove ethylene and propylene therefrom, to produce a fifth stream containing isoamylene and a sixth stream containing $C_6$ and heavier olefins;

converting said fourth stream and said sixth stream together with ethylene from at least one of said first and second reaction zones in a third olefin reaction zone to produce $C_3$ to $C_5$ hydrocarbons; and passing propylene to said first olefin reaction zone from the effluent of at least one of said first and second reaction zones.

2. The process of claim 1 wherein said first olefin re-reaction zone contains a double bond isomerization catalyst and an olefin reaction catalyst.

3. The process of claim 2 wherein the catalyst in said first olefin reaction zone comprises tungsten oxide on silica as an olefin reaction catalyst and magnesium oxide as a double bond isomerization catalyst and the catalyst in said second and third olefin reaction zones comprises tungsten oxide on silica as an olefin reaction catalyst.

4. The process of claim 1 wherein the effluent from said first olefin reaction zone is separated in a first separation zone;

said second stream is passed from said first separation zone into said skeletal isomerization zone;

said third stream is passed from said first separation zone into said second olefin reaction zone;

the effluent from said skeletal isomerization zone and the effluent from said second olefin reaction zone are separated in a second separation zone;

the effluent from said third olefin reaction zone is passed into said first separation zone;

n-butene and isobutene are recycled from said second separation zone into said second olefin reaction zone and amylenes are produced from said second separation zone.

References Cited

UNITED STATES PATENTS

| 2,900,429 | 8/1959 | Heinemann et al. | 260—683.2 |
| 3,261,879 | 7/1966 | Banks | 260—683 |
| 3,365,513 | 1/1967 | Heckelsberg | 260—683 |
| 3,457,320 | 7/1969 | Stapp et al. | 260—683 |

DELBERT E. GANTZ, Primary Examiner

C. E. SPRESSER, Jr., Assistant Examiner